May 29, 1923.

J. Q. BILLINGS

TRACTOR ATTACHMENT

Filed Sept. 24, 1921

1,456,668

2 Sheets-Sheet 2

Inventor
J. Q. Billings.
By Mason, Fenwick & Lawrence
Attorneys.

Patented May 29, 1923.

1,456,668

UNITED STATES PATENT OFFICE.

JOSIAH QUINCY BILLINGS, OF HAMMOND, LOUISIANA.

TRACTOR ATTACHMENT.

Application filed September 24, 1921. Serial No. 502,845.

*To all whom it may concern:*

Be it known that I, JOSIAH QUINCY BILLINGS, a citizen of the United States, residing at Hammond, in the parish of Tangipahoa and State of Louisiana, have invented certain new and useful Improvements in Tractor Attachments; and I do hereby declare the following to be a full, clear, and exact description of the invention, such as will enable others skilled in the art to which it appertains to make and use the same.

This invention relates to new and useful improvements in tractor attachments, and more particularly to means for attaching an implement or implements to any well known make of tractor, the main object of the present invention being the provision of an attaching device whereby different types of agricultural implements may be quickly and readily attached to various forms and types of tractors in use at the present time, and whereby the agricultural implements may be adjusted with respect to the tractor and raised and lowered when so desired.

Another object of the present invention is the provision of a device for attaching implements to any well known make of tractor wherein means is provided for equalizing the power necessary to raise or lower the implements attached to the tractor.

Another object of the invention is the provision of an attaching device whereby agricultural implements may be quickly and readily attached to any well known make of tractor or detached therefrom and the raising and lowering of the implement be readily controlled from the seat of the operator, the implement being also retained in a raised or lowered position as desired, and also to provide means for adjusting the implements laterally after being attached to the tractor.

A further object of the invention is the provision of an attaching device whereby agricultural implements may be attached to a tractor in such a manner that both the implement and the tractor will be arranged as one unit, thus decreasing the turning radius of the tractor and implement so that the tractor may be used on small farms and small pieces of land with great advantage.

Figure 1:
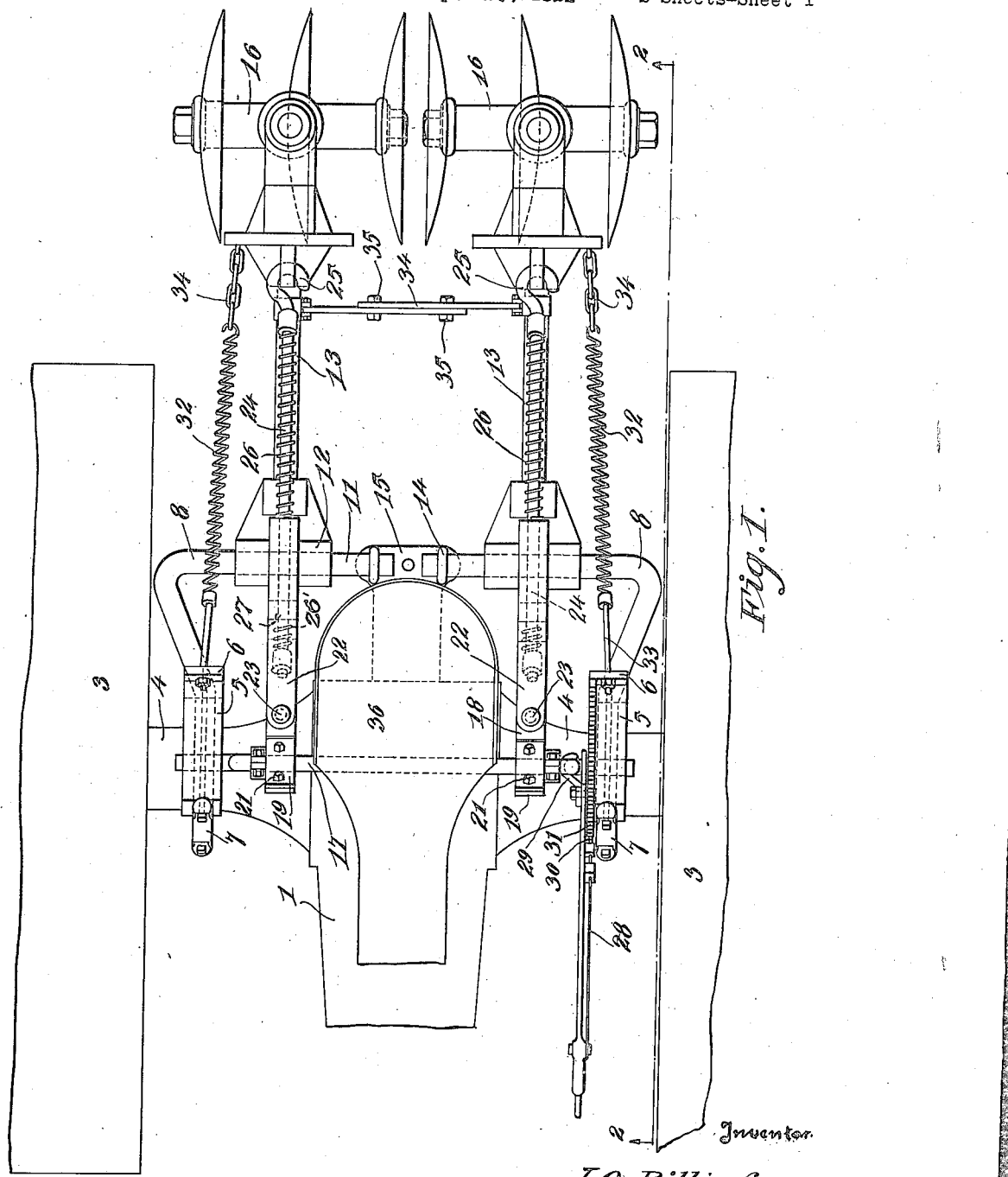
Figure 2:
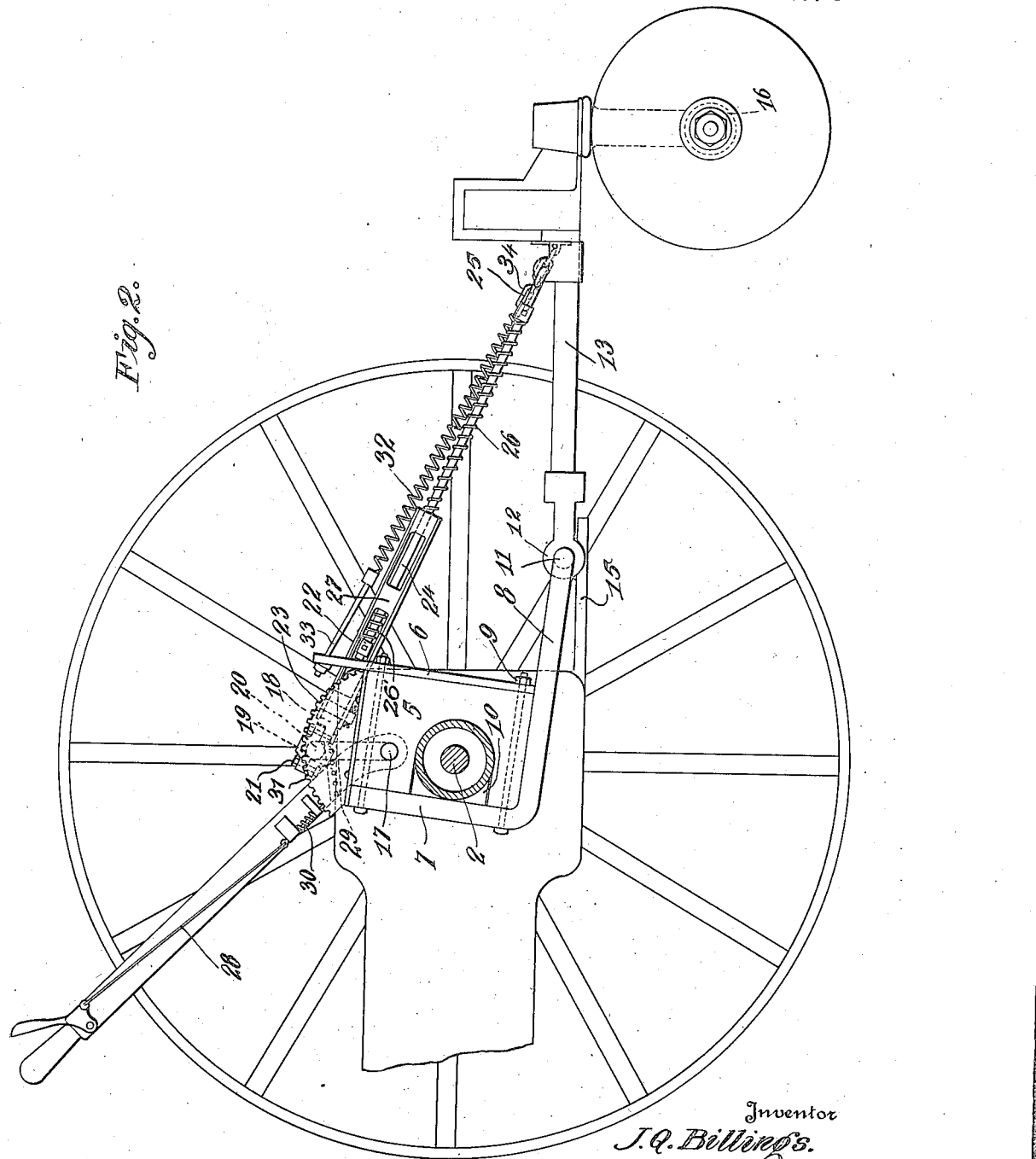

With the above and other objects in view, the invention consists in the novel features of construction, combination and arrangement of parts hereinafter more fully set forth, pointed out in the claims and shown in the accompanying drawings, in which:

Figure 1 is a top plan view of a tractor and implement connected by means of my improved attachment, and Figure 2 is a side elevation.

In the accompanying drawings, the numeral 1 indicates the body portion of a tractor which may be of any well known type having driving shafts 2 for the wheels 3, which are supported at the ends of the housings 4. Mounted upon these housings 4 adjacent each of the wheels 3 are saddle blocks 5. At the rear of each block is a plate 6 and at the front thereof is an upturned arm of a draw bar 48. Bolts 9 passing through arms 7 and plate 6 secure the blocks in position on the housings. The blocks 5 are provided with suitable recesses 10 for the reception of the housing 4. The rear ends of the draw bars 8 are extended inwardly in longitudinal alignment to form a divided shaft 11 upon which bearing sleeves 12 are mounted. These bearing sleeves are connected by means of the rods or bars 13 to each section of the implement which is to be attached to the tractor, in the present instance, a disc, harrow or pulverizer is shown as attached to the tractor, the implement in the present form being constructed in two sections, each of said sections being attached to one of the bars 13.

The adjacent ends of the shaft sections 11 are straddled by U-bolts 14 which extend through a plate 15, said plate being attached in any suitable manner to the body of the tractor and serving to brace said sections.

In order to provide means for raising and lowering the implement which is generally indicated by the numeral 16 a crank shaft 17 is provided, the ends of which are mounted within suitable openings formed in the blocks 5. Stub arms 18 having suitable shaft-receiving bearings 19 are connected to the crank portion 20 of the shaft 17. The bearings are separable as indicated at 21.

Mounted upon the arm 18 is a laterally swingable member 22, the pivot bolt being indicated at 23. Movable within the outer ends of the guides 22 are the ends of the connecting rods 24, the other ends of said rods being suitably connected by means of the hooks 25 to the sections 16 of the implement. In order to cushion the movement of the sections of the implement during its passage over rough and uneven ground, suitable coil springs 26 and 26' are mounted upon the rods 24 on either side of abutment 27 intermediate the ends of the member 22.

In order to provide means for raising and lowering the sections 16 of the implement, a hand lever 28 is connected to the shaft 17. In order to allow proper angular adjustment between the lever and crank shaft 17, a hooked plate 29 is connected to the lever and to the adjacent angular extension of the crank portion 20, the hooked end of the plate engaging said extension and the other end being adjustably connected to the lever as will be readily understood by reference to Fig. 2. From this, it will be apparent that the lever 28 may be adjusted upon the plate 29 to regulate the required raising and lowering of the sections 16. The lever 28 carries a spring actuated pawl 30 adapted to engage the teeth of the segment 31 to retain the lever 28 in various adjusted positions the segment being mounted on block 5. In Fig. 2 the lever 28 is shown in its forward position wherein the sections 16 of the implement have been raised from the ground and when it is desired to lower these sections, the pawl 30 is disengaged from the teeth of the rack 31, the lever 28 being moved rearwardly toward the implement. It will be noted that the lever 28 is arranged directly adjacent the operator's seat so that the sections 16 can be quickly and readily operated to be raised or lowered at the will of the operator.

In order to equalize the power necessary to raise or lower the sections of the implement, suitable coil springs 32 are provided, one end of each being attached by means of a tie bolt 33 to the plate 6, while the other ends of said springs are attached to the implement through the links 34. The two sections of the implement are adjustably connected together by having the arms 34 attached to the forward end of each section, the inner ends of said arms being arranged in overlapped relation and retained in various adjusted positions by means of the bolts 35 which connect the inner ends of the arms. From this it will be apparent that the sections 16 may be readily adjusted toward and away from each other, the member 22 which supports the rods 25 being movable upon the pivot pin 23.

It will be noted that the sections 16 of the implement may be adjusted toward and away from each other the sleeves 12 sliding upon the divided shaft 11 constituting part of the draw bar.

It will be noted that by having the plate 29 provided with a plurality of perforations, the relative movement of the lever 28 may be adjusted upon this plate to regulate the height to which the sections 16 may be raised. It will also be apparent that this device which is utilized for attaching various types of agricultural implements to tractors may be quickly and readily applied to any well known make of tractor and readily attached to various types of agricultural implements.

I claim:

1. A device of the class described including a pair of spaced blocks adapted for connection to a vehicle, a U-shaped draw bar having its terminals connected to said blocks, implement connecting bars slidably mounted upon the draw bar, a crank shaft mounted across said bearing blocks, connecting rods having pivotal connection at one end with the crank shaft and at the other end to the connecting bars, and a lever for actuating said crank shaft as and for the purpose set forth.

2. A device of the character described including a pair of spaced blocks adapted for connection to a vehicle, a draw bar extending between said block to the rear thereof, turnable and laterally movable vehicle-connecting bars carried by the draw bar, a crank shaft having its ends supported by said blocks, stub arms carried by the crank shaft, guide members swingably connected with said arms, rods connected at one end to said connecting bars and at their other ends to said guide members, and a lever connected with the crank shaft to actuate said connecting rods.

3. A device of the class described including a pair of spaced blocks, draw bars connected thereto, implement connecting bars connected to the draw bars, a crank shaft having its ends supported by the bearing blocks, stub arms carried by the crank portion of the crank shaft, connecting rods pivotally connected with the stub arms at one end, cushion means between said rods and implement connecting bars, and an operating lever having connection with the crank shaft to actuate the same as and for the purpose set forth.

4. A device of the class described including bearing blocks, draw bars connected thereto, connecting bars laterally movable on the draw bars, a crank shaft, connecting rods including laterally swingable arms, implement connecting means at the free end of said arms, and an actuating lever having connection with the crank shaft to impart movement to the connecting rods.

5. The combination with a bail-like draw bar having means at its terminals adapted for attachment to a vehicle, a pair of implement-connecting arms swingably and laterally supported by the draw bar, a crank shaft supported by said terminal means, a resilient pitman extending between the free end of said arms and the crank shaft, and means pivotally connecting said pitman to the crank shaft.

In testimony whereof I affix my signature.

JOSIAH QUINCY BILLINGS.